US012334240B2

(12) United States Patent
Fox

(10) Patent No.: US 12,334,240 B2
(45) Date of Patent: Jun. 17, 2025

(54) DOWNHOLE ELECTROMAGNETIC CORE ASSEMBLY

(71) Applicant: Joe Fox, Spanish Fork, UT (US)

(72) Inventor: Joe Fox, Spanish Fork, UT (US)

( * ) Notice: Subject to any disclaimer, the term of this patent is extended or adjusted under 35 U.S.C. 154(b) by 340 days.

(21) Appl. No.: 17/893,575

(22) Filed: Aug. 23, 2022

(65) Prior Publication Data

US 2024/0071675 A1 Feb. 29, 2024

(51) Int. Cl.

| | |
|---|---|
| ***H01F 27/24*** | (2006.01) |
| ***E21B 17/00*** | (2006.01) |
| ***E21B 47/13*** | (2012.01) |
| ***H01F 27/02*** | (2006.01) |
| ***H01F 38/14*** | (2006.01) |

(52) U.S. Cl.

CPC ........... *H01F 27/24* (2013.01); *E21B 17/003* (2013.01); *E21B 47/13* (2020.05); *H01F 27/02* (2013.01)

(58) Field of Classification Search

None

See application file for complete search history.

(56) References Cited

U.S. PATENT DOCUMENTS 11,680,450 B2 * 6/2023 Fox ........................ E21B 47/13 702/6
2004/0104797 A1 * 6/2004 Hall ........................ E21B 47/13 336/132
2004/0145492 A1 * 7/2004 Hall ........................ E21B 17/028 340/854.3
2005/0001738 A1 * 1/2005 Hall ........................ E21B 47/13 340/854.8
2011/0100703 A1 * 5/2011 Harmon .................. E21B 47/01 174/520

FOREIGN PATENT DOCUMENTS

NO 334051 B1 * 11/2013 ........... E21B 17/028

OTHER PUBLICATIONS

No. 334051-B1 English Language Translation (Year: 2013).*

* cited by examiner

*Primary Examiner* — Curtis A Kuntz
*Assistant Examiner* — Jerold B Murphy

(57) ABSTRACT

An electromagnetic core assembly for power and data transmission in a tool string for downhole construction and production comprising an annular mesh housing defining an annular open channel. A magnetically conductive electrically insulating, MCEI, core is disposed within the annular open channel. An annular electrical conductor is imbedded within the MCEI core, the electrical conductor being connected to ground and to a cable running through a downhole tool. The mesh housing may be at least partially electrically insulating and at least partially electrically conducting. The mesh housing may comprise a metal or a nonmetal or a fabric. The mesh housing may comprise MCEI elements. The mesh size of the housing may be sufficient to at least partially contain an electromagnetic field or flux emanating from the electrical conductor. The MCEI core may comprise a depression in its planar top surface above the electrical conductor. The core may comprise reinforcements.

19 Claims, 10 Drawing Sheets

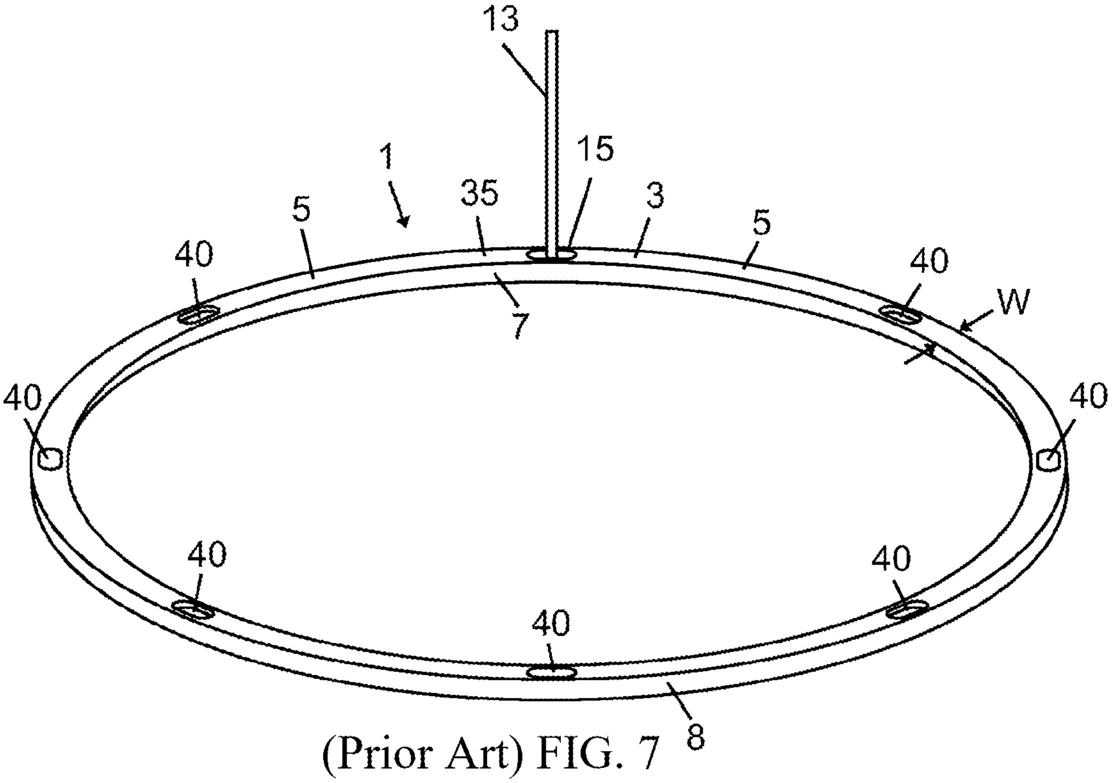
(Prior Art) FIG. 7
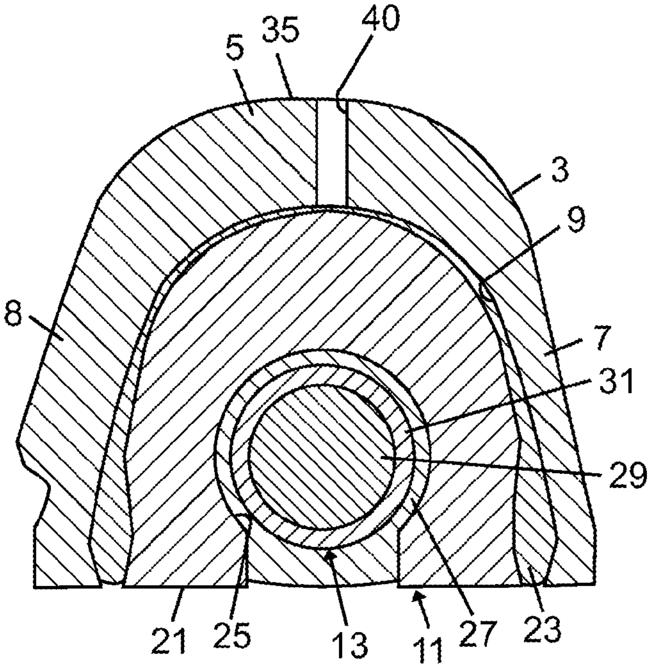
(Prior Art) FIG. 8

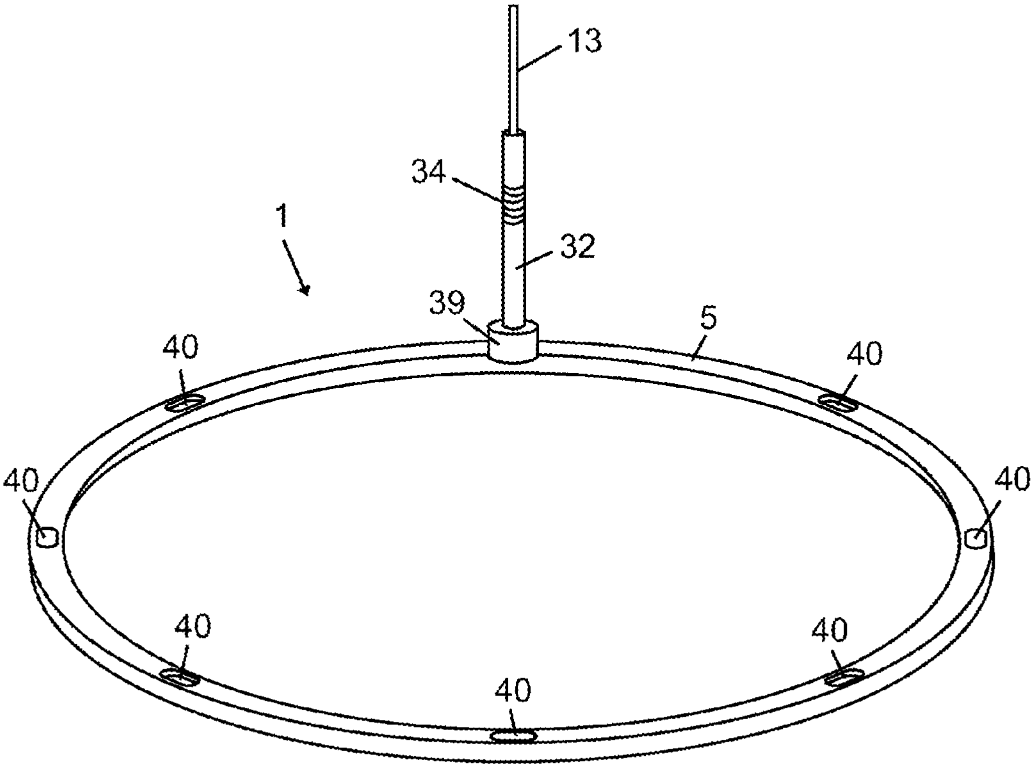
(Prior Art) FIG. 9
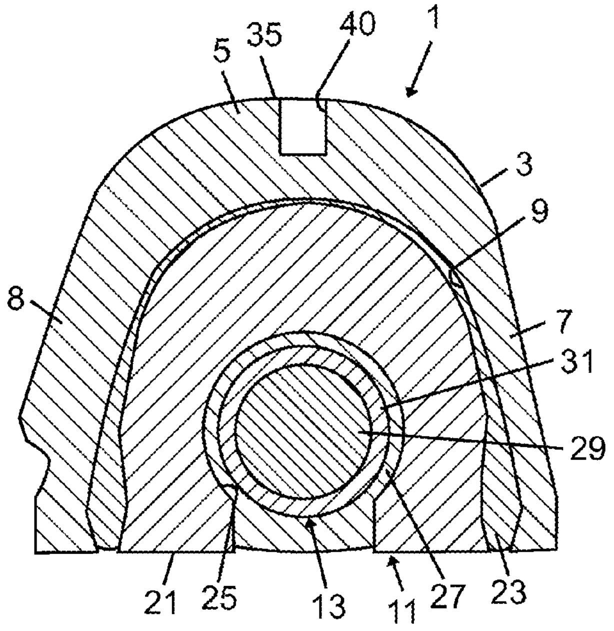
(Prior Art) FIG. 10

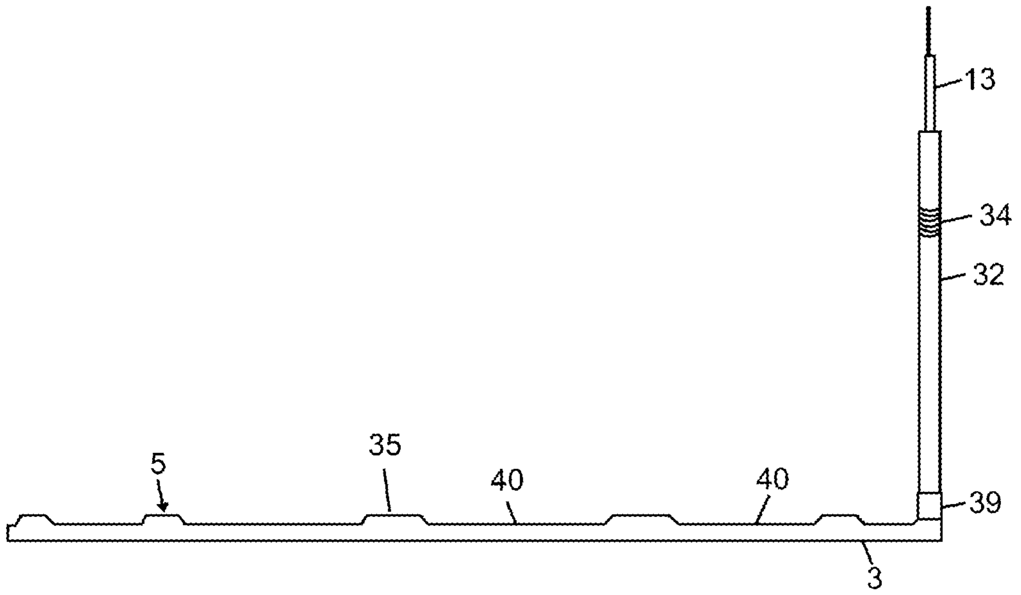
(Prior Art) FIG. 11
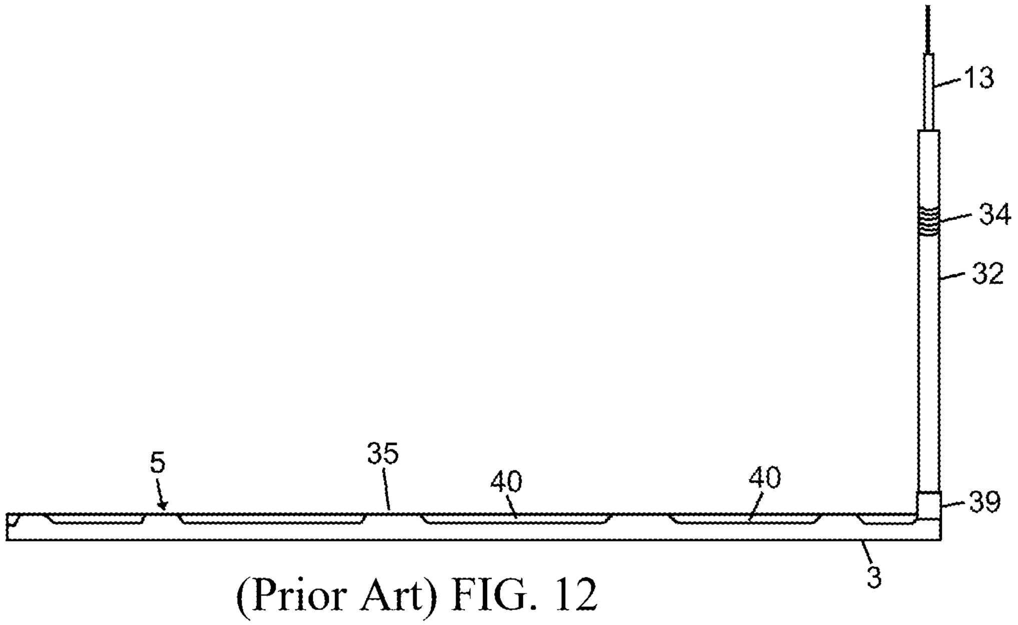
(Prior Art) FIG. 12

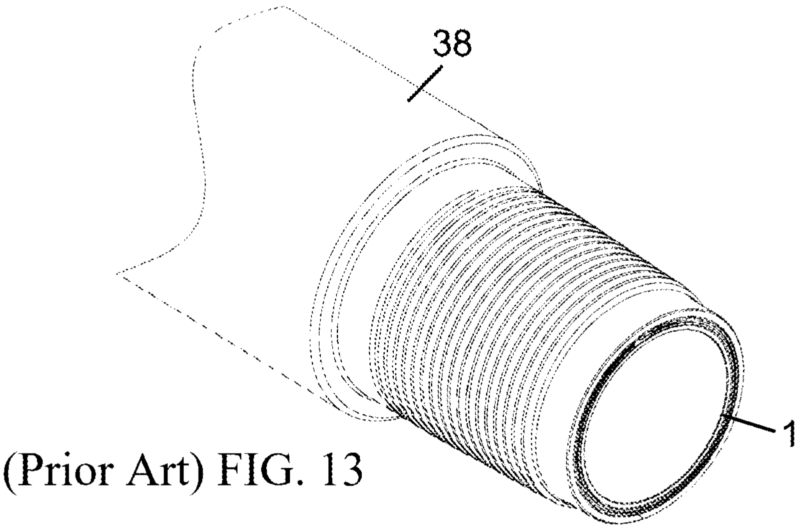
(Prior Art) FIG. 13
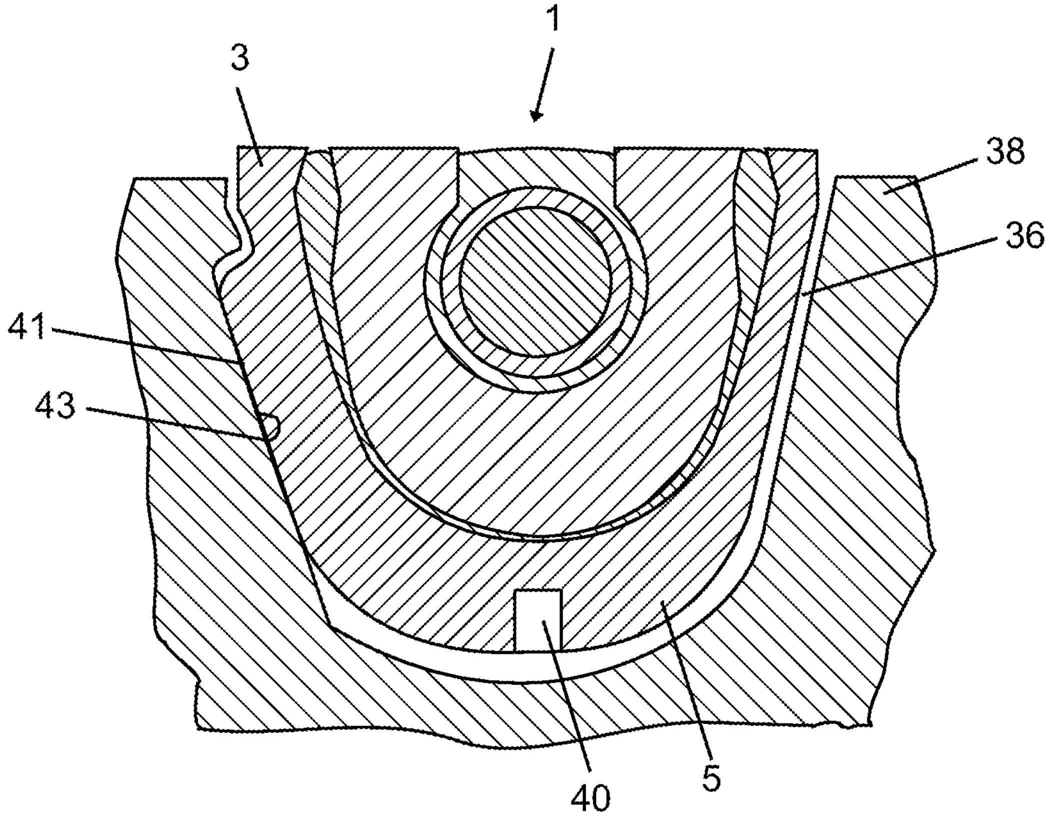
(Prior Art) FIG. 14

DOWNHOLE ELECTROMAGNETIC CORE ASSEMBLY

RELATED PATENT APPLICATIONS

This application presents a modification of U.S. Pat. No. 8,735,743, to Harmon et al., entitled Transducer Device Having Strain Relief Coil Housing, issued May 27, 2014, incorporated herein by this reference for all that it teaches and claims.

U.S. patent application Ser. No. 17/665,533, to Fox, entitled Downhole Transmission System with Perforated MCEI Segments, filed Feb. 5, 2022, is incorporated herein by this reference for all that it teaches and claims.

U.S. patent application Ser. No. 17/713,948, to Fox, entitled Reinforced MCEI Transducer for Downhole Communication, filed Apr. 5, 2022, is incorporated herein by this reference for all that it teaches and claims.

TECHNICAL FIELD

The invention relates generally to borehole telemetry systems. More specifically, the invention relates to transducer devices for transmitting signals along a drill string.

BACKGROUND

In downhole drilling operations, downhole measuring tools are used to gather information about geological formations, status of downhole tools, and other downhole conditions. Such data is useful to drilling operators, geologists, engineers, and other personnel located at the surface. This data may be used to adjust drilling parameters, such as drilling direction, penetration speed, and the like, to effectively tap into an oil or gas bearing reservoir. Data may be gathered at various points along the drill string, such as from a bottom-hole assembly or from sensors distributed along the drill string. Once gathered, apparatus and methods are needed to rapidly and reliably transmit the data to the surface. Traditionally, mud pulse telemetry has been used to transmit data to the surface. However, mud pulse telemetry is characterized by a very slow data transmission rate (typically in a range of 1-6 bits/second) and is therefore inadequate for transmitting large quantities of data in real time. Other telemetry systems, such as wired pipe telemetry system and wireless telemetry system, have been or are being developed to achieve a much higher transmission rate than possible with the mud pulse telemetry system.

Wired pipe telemetry systems using a combination of electrical and magnetic principles to transmit data between a downhole location and the surface are described in, for example, U.S. Pat. Nos. 6,670,880, 6,992,554, and 6,929,493. U.S. Pat. No. 6,670,880, for example, discloses that such a system will transmit data at a rate of least 100 bits/second and conceivably at a rate as high as 1,000,000 bits/second. In these systems, inductive transducers are provided at the ends of wired pipes. The inductive transducers at the opposing ends of each wired pipe are electrical connected by an electrical conductor running along the length of the wired pipe. Data transmission involves transmitting an electrical signal through an electrical conductor in a first wired pipe, converting the electrical signal to a magnetic field upon leaving the first wired pipe using an inductive transducer at an end of the first wired pipe, and converting the magnetic field back into an electrical signal using an inductive transducer at an end of the second wired pipe. Several wired pipes are typically needed for data transmission between the downhole location and the surface.

For uninterrupted data transmission from the downhole location to the surface, the transducer devices used in the wired pipe telemetry system must be electrically and structurally reliable. Several measures have been taken to ensure electrical reliability of inductive transducers. U.S. Pat. No. 6,992,554, for example, describes a robust data transmission element (i.e., inductive transducer) for transmitting information between downhole components. In this patent, the data transmission element includes a U-shaped annular housing. A U-shaped magnetically conducting, electrically insulating (MCEI) element is arranged in the U-shaped annular housing. An insulated conductor is located within the U-shaped MCEI element. As current flows through the insulated conductor, a magnetic flux or field is created around the insulated conductor. The MCEI element contains the magnetic flux created by the insulated conductor and prevents energy leakage into surrounding materials. The annular housing is made of a hard material that is electrically conductive, typically a metal. Although not specifically discussed in this patent, there is a through-hole in the annular housing as well as the MCEI element to allow for insertion of an input lead to the insulated conductor. Thus, a weak spot is inherently designed into the annular housing.

U.S. Pat. No. 6,992,554 discloses that the annular housing stretches as it is forced into the recess within the mating surface of a downhole component. This stretching action provides a rebound force to return the annular housing to its original position when the force is removed. When the annular housing stretches, the area surrounding the through-hole created in the annular housing for the input lead would absorb more of the stretch than the rest of the annular housing. As a result, strain induced in the annular housing as a result of the stretching would concentrate around the through-hole for the input lead. The material in this highly strained region may exceed its elastic limit sooner than the material in the remainder of the annular housing, causing the annular housing and inductive transducer to fail structurally prematurely. This disclosure discloses how to prevent or curb this premature structural failure.

SUMMARY

The following summary description relates to FIGS. 1 through 6. The remaining FIGS. and related text are applicable to this description except as modified by FIGS. 1 through 6.

FIGS. 1 through 6 present an electromagnetic transducer or core assembly. The assembly may be disposed within a downhole tool for developing and producing subterranean natural resources. The assembly may comprise an annular mesh housing. The annular mesh housing may define an annular open channel. The annular mesh housing may comprise a single layer of mesh or it may comprise multiple layers of mesh. The mesh may comprise a fabric or a knitted mesh fabric. A magnetically conductive electrically insulating, MCEI, core may be disposed within the annular open channel. An annular electrical conductor, or coil, may be embedded within the MCEI core. The electrical conductor may be embedded within the MCEI core during manufacturing or post manufacturing of the core. The core may comprise an annular configuration, or it may comprise annular segments. The coil may be connected to ground and to a cable within the downhole tool.

The mesh housing may be at least partially electrically insulating, or the housing may be at least partially electrically conducting. The mesh housing may comprise MCEI elements. The mesh may be a fabric with MCEI elements embedded therein. The mesh housing may be an open mesh or a closed mesh when in the form of a fabric. The mesh housing may comprise a mesh size sufficient to partially contain an electromagnetic field emanating from the electrical conductor disposed within a conductor pathway. Also, the mesh housing may comprise a mesh size sufficient to partially isolate the MCEI core within the conductor pathway from outside electromagnetic interference. The mesh fabric may comprise a nano fiber, carbon fiber, glass fiber, plastic fiber, polymeric fiber, or natural or synthetic rubber fibers suitable for use downhole.

The mesh housing may comprise one or more annular bumpers. The annular bumpers may aid in capturing the mesh housing within a receptacle within the downhole tool. The bumper may seal out downhole conditions of pressure and moisture from the core assembly. The bumper may comprise a single annular bumper, or it may comprise one more bumper segments. The annular bumper may be integral to the mesh housing, or the bumper may be mounted on the mesh housing post manufacturing. The bumpers may comprise a material selected from natural and synthetic materials. The bumpers may be suitable for withstanding sealing out downhole conditions including high temperature, moisture, and vibrations.

The MCEI core may comprise one or more bumper seats within its core wall. The bumper seats may be continuous around the perimeter of the core wall or the seats may be spaced apart coincident with bumper segments. The electromagnetic core assembly may be disposed within a receptacle within a wall of the downhole tool. The receptacle within the wall of the downhole tool may comprise one or more bumper seats aligned with the bumper seats within the MCEI core. The respective bumper seats may provide a sealing surface allowing the bumper to act as a seal against the downhole environment.

The MCEI core may comprise an annular planar top surface above the electrical conductor within the pathway. The planar top surface may provide an inductive connection with a similarly configured MCEI core of an adjacent downhole tool as taught in the prior art references incorporated herein and made hereof. The electrical conductor may be disposed within the MCEI core between the planar top surface and the core wall. The pathway may be formed within the core when the core is manufactured or it may be machined into the core post manufacturing. The pathway may provide a channel for the electrical conductor when the conductor is inserted into the core after manufacturing.

The electromagnetic core assembly may comprise an MCEI core comprising a partially planar top surface comprising an annular depression above the embedded electrical conductor. The annular depression interrupts the otherwise planar top surface providing a gap between two adjacent cores when the downhole tools are assembled into a tool string.

The electromagnetic core assembly may comprise an MCEI core comprising a partially planar top surface comprising an annular open trough. An electrical conductor may be laid within the annular open trough. The electrical conductor laid within the annular open trough may comprise a planar top surface aligned and flush with the partially planar top surface of the MCEI core. However, the planar top surface of the conductor may be offset from the planar top surface portion of the MCEI core, being below flush with the MCEI core. The electrical conductor laid within the annular open trough may be fixed or contained within the trough by an adhesive polymer filler. The filler may act to hold the conductor in place and, also, insulate the conductor from the core. The filler may be suitable for resisting the adverse conditions downhole.

The MCEI cores may comprise one or more perforations. The one or more perforations may be aligned with passageways within the annular mesh housing. The perforations may be in communication with the respective electrical conductors and allow the ends of the electrical conductors and to exit the respective cores. One of the perforations may be aligned with a ground connection within the downhole tool. Another perforation may be aligned with a communication or power cable running within the downhole tool. The respective perforations may comprise seals to protect against the adverse conditions downhole. The perforations may be in communication with the channel, providing access to the electrical conductors. Core perforations are further taught by the ’533 reference made part hereof.

The MCEI cores may comprise internal reinforcements. Reinforcements within the core may comprise rods, strings, nets, and meshes. Such reinforcements are further taught by the ’556 reference made part hereof.

The following portion of the summary is taken from the ’743 reference and applies to FIGS. 1-6 and related text except as modified herein.

In a first aspect, the present invention relates to a transducer device comprising: an annular housing having a base wall adjoining a pair of annular side walls, the base and side walls defining an annular groove, the base wall having an access port and at least one strain relief opening formed therein, the at least one strain relief opening being spaced apart from the access port; and a conductor disposed in the annular groove.

In certain embodiments of the first aspect of the present invention, the at least one strain relief opening is a through-hole extending from the exterior surface of the base wall to the annular groove.

In certain embodiments of the first aspect of the present invention, the at least one strain relief opening is a blind hole extending from the exterior surface of the base wall partially into the base wall.

In certain embodiments of the first aspect of the present invention, the at least one strain relief opening is a slot formed in the exterior surface of the base wall.

In certain embodiments of the first aspect of the present invention, the slot is a half-slot having a radial width less than a radial width of the base wall.

In certain embodiments of the first aspect of the present invention, the slot is a full-slot having a radial width equal to a radial width of the base wall.

In certain embodiments of the first aspect of the present invention, a plurality of strain relief openings are formed in the base wall.

In certain embodiments of the first aspect of the present invention, the strain relief openings and access port are uniformly spaced-apart along the base wall.

In certain embodiments of the first aspect of the present invention, the access port extends from the annular groove to an exterior surface of the base wall.

In certain embodiments of the first aspect of the present invention, the conductor extends through the access port to an exterior of the annular housing.

In certain embodiments of the first aspect of the present invention, the annular housing is adapted for mounting on a tubular.

In a second aspect, the present invention relates to a downhole tool comprising: a tubular having a receptacle and a transducer device according to the first aspect of the present invention disposed in the receptacle.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

(PRIOR ART) FIG. 7 is a perspective view of a transducer device.

(PRIOR ART) FIG. 8 is a radial cross-section of the transducer device including strain relief through-holes.

(PRIOR ART) FIG. 9 is a perspective view of a transducer device.

(PRIOR ART) FIG. 10 is a radial cross-section of a transducer device including strain relief blind holes.

(PRIOR ART) FIG. 11 is a side view of a transducer device including strain relief full-slots.

(PRIOR ART) FIG. 12 is a side view of a transducer device including strain relief half-slots.

(PRIOR ART) FIG. 13 shows the transducer of (PRIOR ART) FIG. 1 mounted on a downhole tool.

(PRIOR ART) FIG. 14 is a radial cross-section of a transducer device mounted in a recess of a downhole tool.

DETAILED DESCRIPTION

Figure 1:
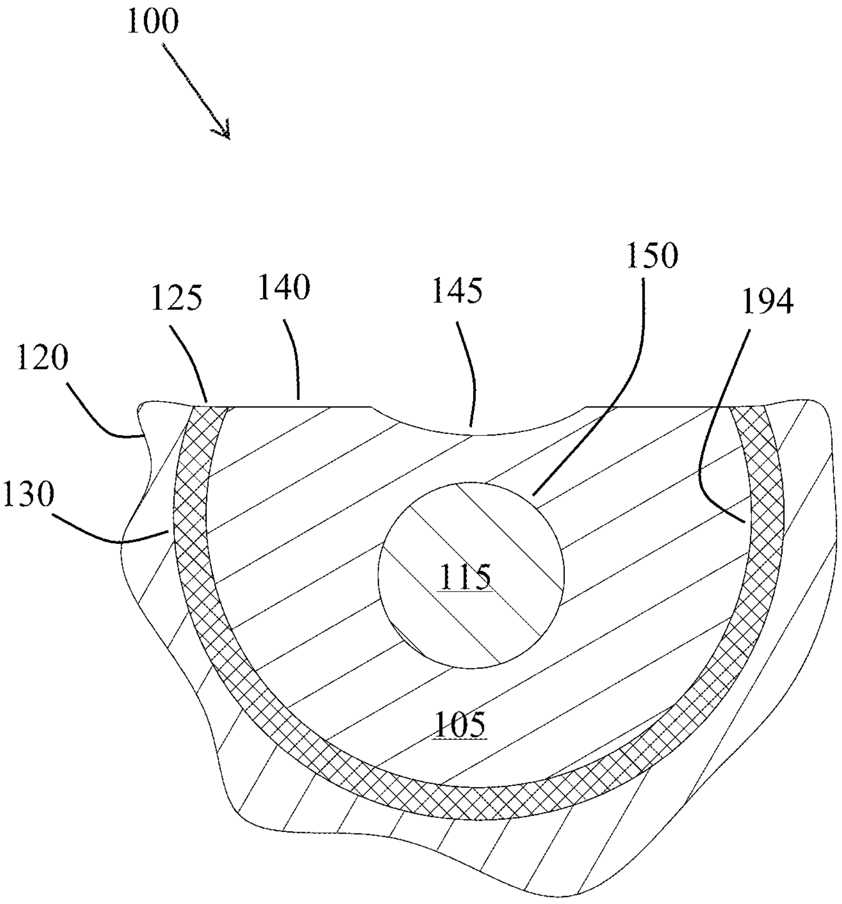
FIG. 1 is a sectioned diagram of an electromagnetic core assembly of the present invention.

The present invention will now be described in detail, with reference to the accompanying drawings. In this detailed description, numerous specific details may be set forth in order to provide a thorough understanding of the invention. However, it will be apparent to one skilled in the art when the invention may be practiced without some or all of these specific details. In other instances, well-known features and/or process steps may not be described in detail so as not to unnecessarily obscure the invention. In addition, like or identical reference numerals may be used to identify common or similar elements.

Figure 2:
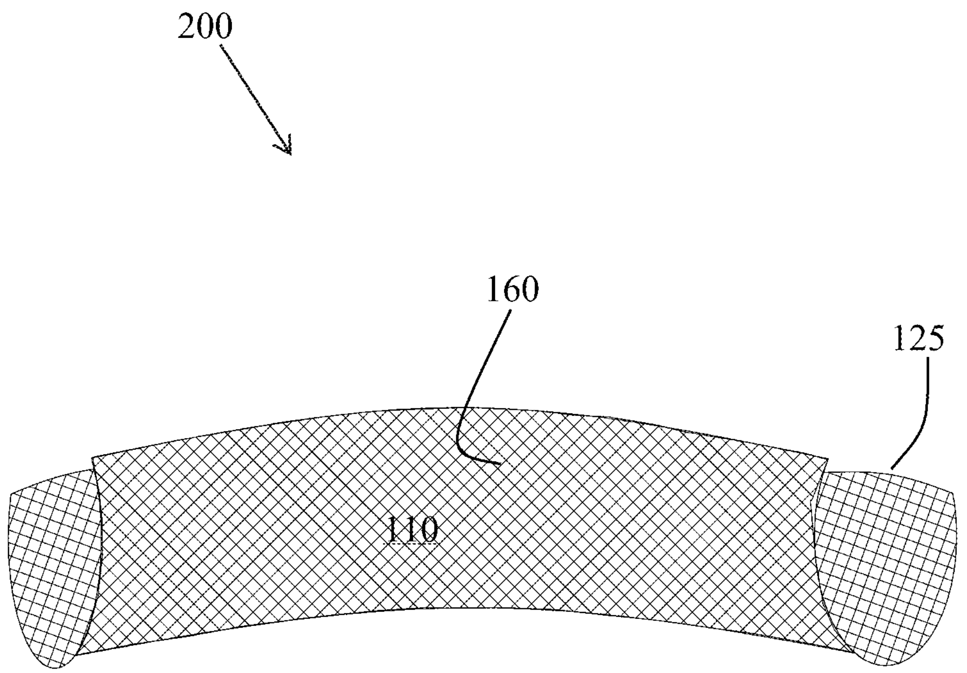
FIG. 2 is a partial perspective diagram of mesh housing of the present invention.
Figure 3:
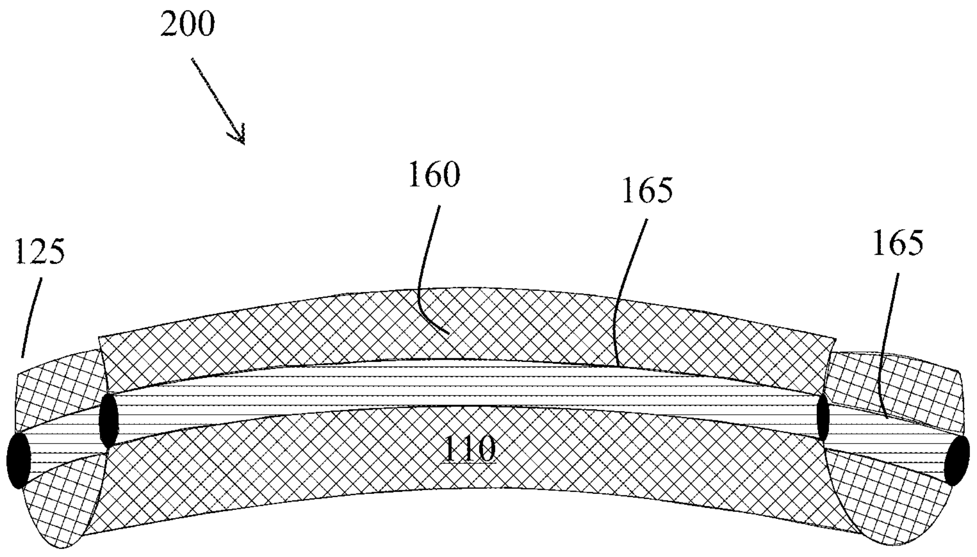
FIG. 3 is a partial perspective diagram of a mesh housing comprising bumpers.
Figure 4:
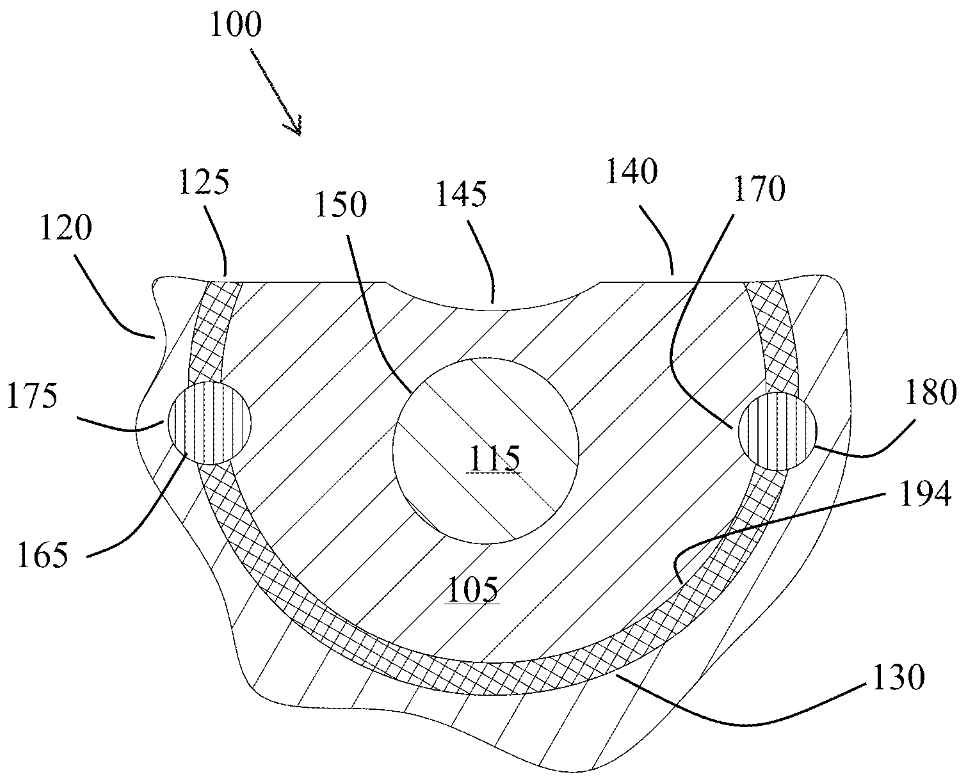
FIG. 4 is a sectioned diagram of an iteration of an electromagnetic core assembly of the present invention.
Figure 5:
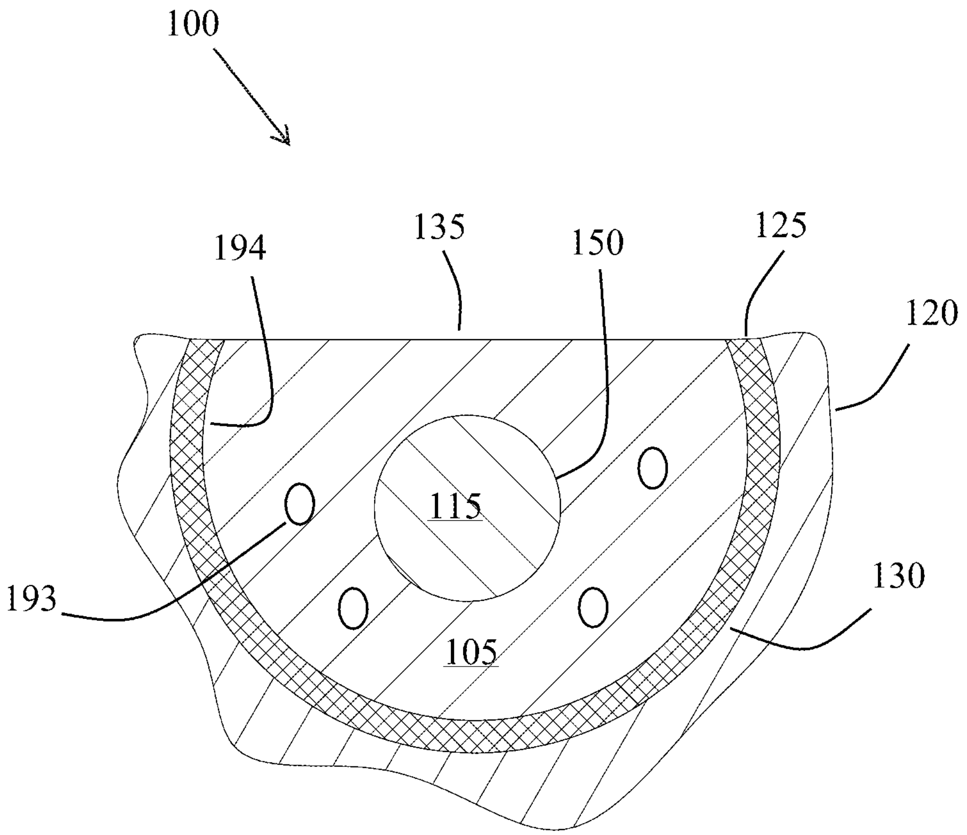
FIG. 5 is a sectioned diagram of an iteration of an electromagnetic core assembly of the present invention.
Figure 6:
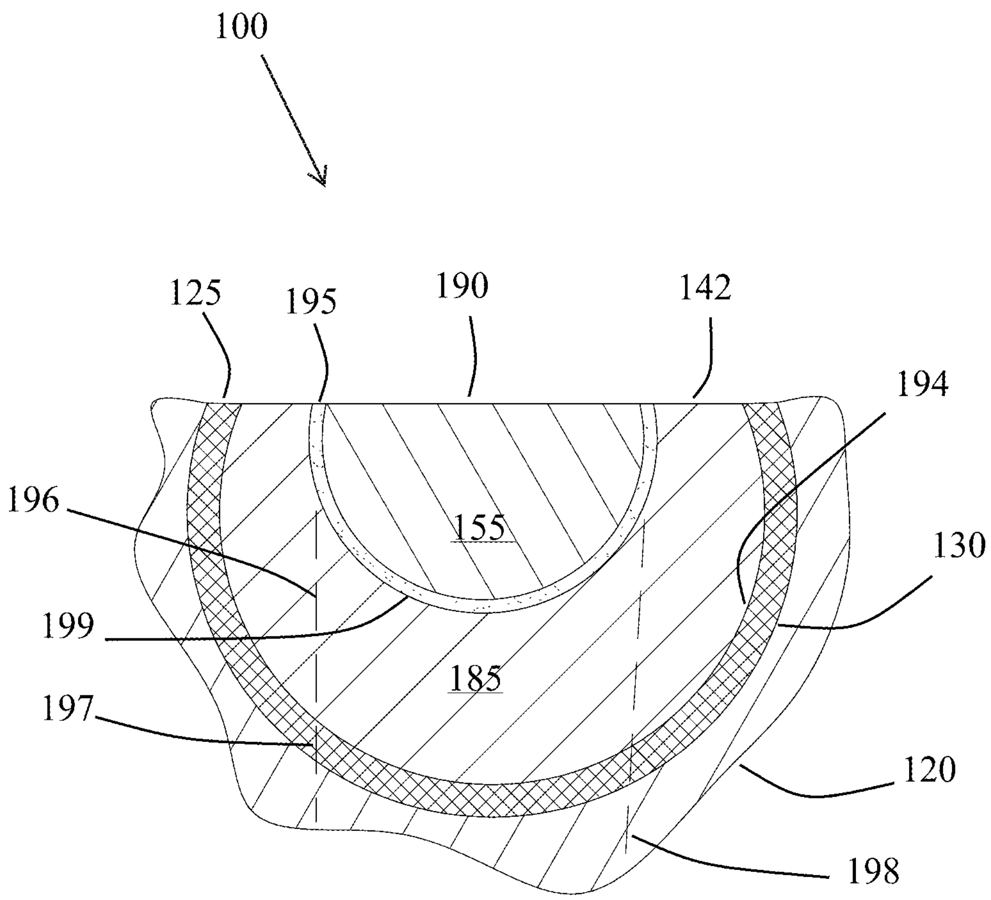
FIG. 6 is a sectioned diagram of an iteration of an electromagnetic core assembly of the present invention.

The following detailed description relates to FIGS. 1 through 6. The remaining FIGS. and related text are applicable to this detailed description except as modified by FIGS. 1 through 6.

FIGS. 1 through 6 present an electromagnetic transducer or core assembly 100. The assembly 100 may be disposed within a downhole tool for transmitting power and data when developing and producing subterranean natural resources. The assembly 100 may comprise an annular mesh housing 200. The annular mesh housing 200 may define an annular open channel 125. The annular mesh housing may comprise a single layer of mesh or it may comprise multiple layers of mesh. The mesh may comprise a fabric or a knitted mesh fabric. A magnetically conductive electrically insulating, MCEI, core 105 may be disposed within the annular open channel 125. An annular electrical conductor 115, or coil, may be embedded within the MCEI core 105. The electrical conductor 115 may be embedded within the MCEI core during manufacturing or post manufacturing of the core 105. The core 105 may comprise an annular configuration, or it may comprise annular segments. The coil 115 may be connected to ground and to a cable within the downhole tool.

The mesh housing 200 may be at least partially electrically insulating, or the housing 200 may be at least partially electrically conducting. The mesh housing 200 may comprise MCEI elements. The mesh 200 may be a fabric with MCEI elements embedded therein. The mesh housing 200 may be an open mesh or a closed mesh when in the form of a fabric. The mesh housing 200 may comprise a mesh size 160 sufficient to partially contain an electromagnetic field emanating from the electrical conductor 115 disposed within a conductor pathway 150. Also, the mesh housing 200 may comprise a mesh size 160 sufficient to partially isolate the MCEI core 105 within the conductor pathway 150 from outside electromagnetic interference. The mesh fabric may comprise a nano fiber, carbon fiber, glass fiber, plastic fiber, polymeric fiber, or natural or synthetic rubber fibers suitable for use downhole.

The mesh housing 200 may comprise one or more annular bumpers 165. The annular bumpers 165 may aid in capturing the mesh housing 200 within a receptacle 130 within the downhole tool. The bumper 165 may seal out downhole conditions of pressure and moisture from the core assembly 100. The bumper 165 may comprise a single annular bumper, or it may comprise one more bumper segments 180. The annular bumper 165/180 may be integral to the mesh housing 200, or the bumper may be mounted on the mesh housing 200 post manufacturing. The bumpers 165/180 may comprise a material selected from natural and synthetic materials. The bumpers may be suitable for withstanding sealing out downhole conditions including high temperature, moisture, and vibrations.

The MCEI core 105 may comprise one or more bumper seats 170 within its core wall 194. The bumper seats 170 may be continuous around the perimeter of the core wall 194, or the seats 170 may be spaced apart coincident with bumper segments 180. The electromagnetic core assembly 100 may be disposed within a receptacle 130 within a wall 120 of the downhole tool. The receptacle 130 within the wall 120 of the downhole tool may comprise one or more bumper seats 175 aligned with the bumper seats 170 within the MCEI core. The respective bumper seats may provide a sealing surface allowing the bumper to act as a seal against the downhole environment.

The MCEI core 105 may comprise an annular planar top surface 135 above the electrical conductor 115 within the pathway 150. The planar top surface 135 may provide an inductive connection with a similarly configured MCEI core of an adjacent downhole tool as taught in the prior art references incorporated herein and made hereof. The electrical conductor may be disposed within the MCEI core 105 between the planar top surface 135 and the core wall 194. The pathway 150 may be formed within the core 105 when the core is manufactured or it may be machined into the core post manufacturing. The pathway 150 may provide a channel for the electrical conductor 115 when the conductor is inserted into the core 105 after manufacturing.

The electromagnetic core assembly may comprise an MCEI core 105 comprising a partially planar top surface 140 comprising an annular depression 145 above the embedded electrical conductor 115. The annular depression 145 interrupts the otherwise planar top surface providing a gap between two adjacent cores when the downhole tools are assembled into a tool string.

The electromagnetic core assembly may comprise an MCEI core 185 comprising a partially planar top surface 142 comprising an annular open trough 199. An electrical conductor 155 may be laid within the annular open trough 199. The electrical conductor 155 laid within the annular open trough 199 may comprise a planar top surface 190 aligned and flush with the partially planar top surface 142 of the MCEI core 185. However, the planar top surface 190 of the conductor 155 may be offset from the planar top surface portion 142 of the MCEI core 185, being below flush with the MCEI core. The electrical conductor 155 laid within the annular open trough 199 may be fixed or contained within the trough 199 by an adhesive polymer filler 195. The filler may act to hold the conductor 155 in place and, also, insulate the conductor from the core 185. The filler 195 may be suitable for resisting the adverse conditions downhole.

The MCEI cores 105/185 may comprise one or more perforations 196. The one or more perforations 196 may be aligned with passageways 197 within the annular mesh housing 200. The perforations may be in communication with the respective electrical conductors and allow the ends of the electrical conductors 115 and 155 to exit the respective cores 105/185. One of the perforations may be aligned with a ground connection within the downhole tool. Another perforation may be aligned with a communication or power cable running within the downhole tool. The respective perforations may comprise seals to protect against the adverse conditions downhole. The perforations may be in communication with the channel 150, providing access to the electrical conductors. Core perforations are further taught by the '533 reference made part hereof.

The MCEI cores 105/185 may comprise internal reinforcements 193. Such reinforcements are further taught by the '556 reference made part hereof.

The following portion of the detailed description is taken from the '743 reference and applies to the teachings hereof except as modified by this application.

(PRIOR ART) FIG. 7 shows a transducer device 1 according to certain aspects of the present invention. The transducer device 1 has an annular housing 3 made of an inner annular side wall 7, an outer annular side wall 8, and a base wall 5 adjoining the side walls 7, 8. The annular housing 3 is made of a hard electrically conductive material, typically a metal such as steel, titanium, chrome, nickel, aluminum, iron, copper, tin, and lead. (PRIOR ART) FIG. 8 shows that the walls 5, 7, 8 define an annular groove 9. A coil assembly 11 is disposed in the annular groove 9. The coil assembly 11 includes a conductor 13 disposed and retained in an insert 21, where the insert 21 is disposed and retained in the annular groove 9 of the annular housing 3. The conductor 13 is an insulated conductor including a conductor 29 surrounded by an electrically insulating material 31. The conductor 13 may be, for example, a nickel- or silver-plated, copper-clad, stainless-steel wire. Other types of conductors are known in the art. The conductor 13 may have a cross-section that is circular or has other shape, e.g., rectangular. In the coil assembly 11, as current flows through the conductor 13, a magnetic flux or field is created around the conductor 13. In (PRIOR ART) FIG. 7, the conductor 13 extends through an access port 15 formed in the base wall 5. The access port 15 is a through-hole in that it extends through the thickness of the base wall 5 in order to provide a path between the annular groove 9 in (PRIOR ART) FIG. 8 and the exterior surface 35 of the base wall 5. In (PRIOR ART) FIG. 9, an anti-rotation sleeve 39 is installed at the access port 15 in (PRIOR ART) FIG. 7. An insulating coating 32 may be applied on a portion of the conductor 13. A seal stack 34 may be provided on a portion of or above the insulating coating 32 to provide a seal between the conductor 13 and a tool body (i.e., when the transducer device 1 is mounted in a tool body).

In general, the coil assembly 11 may have any configuration suitable for converting a magnetic field to an electrical field or an electrical field to a magnetic field. Examples of suitable coil assemblies are disclosed in, for example, U.S. Pat. Nos. 6,670,880, 6,992,554, and 6,929,493. Said patents are incorporated herein by these respective references for all they teach and claim. The insert 21 may be configured to perform functions such as containing magnetic flux created by the conductor 13 within the annular housing 3 and transferring magnetic current to another insert of another transducer device during a data transmission operation using two oppositely arranged transducer devices. If the coil assembly 11 is similar to the ones disclosed in U.S. Pat. No. 6,992,554, then the insert 21 would be a U-shaped magnetically conducting electrically insulating (MCEI) element as described in U.S. Pat. No. 6,992,554. In this case, the insert 21 may be retained in the annular groove 3 via a polymer layer 23 disposed between the walls 5, 7, 8 of the annular housing 3 and the insert 21. The conductor 13 may be retained in a pocket 25 provided by the insert 21 via a polymer layer 27 disposed in the pocket 25 between the insert 21 and the conductor 13. In an alternative example, the coil assembly 11 may have a structure similar to the one disclosed in U.S. Pat. No. 6,929,493, where the insert 21 would be made of a resilient material and fit snugly in the annular groove 9, and the conductor 13 would fit snugly in a pocket provided by the insert 21. In general, the annular housing 3 and the insert 21 may be provided with snap features such as undercuts and recesses to assist in retaining the insert 21 in place within the annular groove 9 of the annular housing 3.

Referring to (PRIOR ART) FIG. 7 or 9, a plurality of openings 40 are formed in the base wall 5. The openings 40 are for strain relief. At the location of each of the strain relief openings 40 and the access port 15, the base wall 5 has a reduced cross-sectional area. If the strain relief openings 40 had not been formed in the base wall 5 as illustrated in (PRIOR ART) FIG. 7 or 9, strain induced in the annular housing 3 will concentrate mostly at the reduced cross-sectional area at the location of the access port 15, possibly resulting in premature failure of the annular housing 3 as explained in the background. However, with the provision of the strain relief openings 40 in the base wall 5, strain induced in the annular housing 3 (e.g., as a result of the annular housing 3 stretching) will be distributed among the reduced cross-sectional areas at the location of the strain relief openings 40 and the access port 15. By sharing the strain burden, the strain relief openings 40 reduce the amount of strain concentrated at the location of the access port 15. Preliminary tests suggest that providing the strain relief openings 40 in the base wall 5 can potentially increase the life expectancy of the transducer device 1 by a minimum of 2,000% with minimal impact on strength and rebound force of the annular housing 3.

Preferably, there are at least two strain relief openings 40 formed in the base wall 5 in addition to the access port 15. As shown in (PRIOR ART) FIG. 8, the strain relief openings 40 formed in the base wall 5 may be through-holes, i.e., extending through the base wall 5, from the outer surface 35 of the base wall 5 to the annular groove 9, as shown in (PRIOR ART) FIG. 8. Alternatively, as shown in (PRIOR ART) FIG. 10, the strain relief openings 40 may be blind holes, i.e., extending only partially into the base wall 5 (from the exterior surface 35 of the base wall 5). A mixture of through-hole and blind-hole strain relief openings 40 may be formed in the base wall 5, as shown in (PRIOR ART) FIG. 7 or 9. Alternatively, only through-hole strain relief openings 40 or blind-hole strain relief openings 40 may be formed in the base wall 5. Alternatively, as shown in (PRIOR ART) FIGS. 11 and 12, the strain relief openings 40 may be slots cut in the exterior surface 35 of the base wall 5. In (PRIOR ART) FIG. 11, the slots 40 are full-slots in that they extend fully across the radial width of the base wall 5. The radial width W of the base wall 5 is indicated in (PRIOR ART) FIG. 13. The radial width of a full slot is equal to the radial width W of the base wall 5. In (PRIOR ART) FIG. 12, the slots 40 are half-slots in that they extend partially across the width of the base wall 5. The radial width of a half-slot is less than the radial width W of the base wall 5. The half-slot may start from the side of the base wall 5 adjacent to the outer annular side wall 8 in (PRIOR ART) FIG. 7 or the side of the base wall 5 adjacent to the inner annular side wall 7 in (PRIOR ART) FIG. 7 to some point along the radial width W of the base wall 5. The wall of each of the strain relief openings 40 may be straight or may be angled or chamfered. In (PRIOR ART) FIGS. 7, 9, 11, and 12 the strain relief openings 40 are spaced apart from the access port 15 and also from each other. Preferably, the strain relief openings 40 and access port 15 are uniformly spaced apart along the base wall 5 so that the strain induced in the annular housing 3 is uniformly distributed along the base wall 5. The strain relief openings 40 may have any desired shape, e.g., circular, square, rectangular, oval, rectangular with rounded corners, and square with rounded corners. Preferably, the strain relief openings 40 do not have sharp corners at the exterior surface 35 of the base wall 5 that can act as stress concentrators.

(PRIOR ART) FIG. 13 shows the transducer device 1 mounted on a downhole tool 38. In (PRIOR ART) FIG. 13, the downhole tool 28 is a tubular. The tubular can be any tubular adapted for use in borehole operations, e.g., drill pipe, casing, metallic pipe, non-metallic pipe, wired pipe, and non-wired pipe. In (PRIOR ART) FIG. 14, the transducer device 1 is disposed in a recess 36 of the downhole tool 38. The downhole tool 38 may be, for example, a wired pipe, and the recess 36 may be formed in a shoulder of the wired pipe. In (PRIOR ART) FIG. 14, the annular housing 3 has an angled surface 41, and the recess 36 has an angled surface 43 in opposing relation to the angled surface 41 of the annular housing 3. The angled surface 41 of the annular housing 3 acts as a spring against the angled surface 43 of the recess 36. As force is applied to the transducer device 1 and the angled surface 41 presses down on the angled surface 43, the annular housing 3 stretches. This stretching action provides a rebound force to return the annular housing 3 to its original position once the force is removed. The stretching of the annular housing 3 will induce strain in the annular housing 3. As explained above, the strain relief openings 40 in the base wall 5 of the annular housing 3 will distribute the induced strain along the base wall 5 so that the annular housing 3 does not fail prematurely due to excess concentration of strain at a single location, i.e., at access port 15 in (PRIOR ART) FIG. 7 in the base wall 5.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An electromagnetic core assembly, comprising:
- a U-shaped annular magnetically conductive electrically insulating (MCEI) mesh housing comprising opposed vertical sides joined by a bottom side and one or more annular bumper stripes circumscribing at least one of the opposed vertical sides;
- the U-shaped MCEI annular mesh housing defining an annular open channel bounded by the opposed vertical sides and bottom side;
- an annular U-shaped MCEI core comprising opposed vertical sides joined by a bottom side disposed within the annular open channel, and
- an annular electrical conductor embedded within the U-shaped MCEI core wherein the MCEI core comprises annular reinforcement rods embedded within the MCEI core.

2. The electromagnetic core assembly of claim 1, wherein the U-shaped MCEI mesh housing is at least partially electrically insulating.

3. The electromagnetic core assembly of claim 1, wherein the U-shaped MCEI mesh housing is at least partially electrically conducting.

4. The electromagnetic core assembly of claim 1, wherein the U-shaped MCEI mesh housing comprises MCEI elements.

5. The electromagnetic core assembly of claim 1, wherein the U-shaped MCEI mesh housing comprises a mesh size sufficient to at least partially contain an electromagnetic field emanating from the electrical conductor.

6. The electromagnetic core assembly of claim 1, wherein the U-shaped MCEI mesh housing comprises a mesh size sufficient to at least partially isolate the MCEI core from outside electromagnetic interference.

7. The electromagnetic core assembly of claim 1, wherein the U-shaped MCEI mesh housing comprises one or more radially opposed annular bumper stripes on its opposed vertical sides.

8. The electromagnetic core assembly of claim 1, wherein the U-shaped MCEI mesh housing comprises one more bumper stripe segments.

9. The electromagnetic core assembly of claim 1, wherein the MCEI core comprises one or more bumper stripe seats.

10. The electromagnetic core assembly of claim 1, wherein the electromagnetic core assembly is disposed within a receptacle within a wall of a downhole tool.

11. The electromagnetic core assembly of claim 10, wherein the receptacle within the wall of the downhole tool comprises one or more bumper stripe seats aligned with bumper stripe seats within the the electromagnetic core assembly.

12. The electromagnetic core assembly of claim 1, wherein the U-shaped MCEI core comprises an annular planar top surface.

13. The electromagnetic core assembly of claim 1, wherein the U-shaped MCEI core comprises a partially planar top surface comprising an annular depression above the embedded electrical conductor.

14. The electromagnetic core assembly of claim 1, wherein the U-shaped MCEI core comprises a partially planar top surface comprising an annular open trough.

15. The electromagnetic core assembly of claim 14, wherein the electrical conductor is laid within the annular open trough.

16. The electromagnetic core assembly of claim 14, wherein the electrical conductor laid within the annular open trough comprises a top surface aligned with the partially planar top surface of the U-shaped MCEI core.

17. The electromagnetic core assembly of claim 14, wherein the electrical conductor laid within the annular open trough is contained within the trough by a polymer filler.

18. The electromagnetic core assembly of claim 1, wherein the U-shaped MCEI core comprises one or more perforations through its bottom side.

19. The electromagnetic core assembly of claim 18, wherein the one or more perforations are aligned with passageways within the bottom side of the annular U-shaped MCEI mesh housing.

* * * * *